United States Patent
Ambler et al.

[15] 3,668,470
[45] June 6, 1972

[54] DEVICE FOR DETECTION AND CONTROL OF CURRENT LEAKAGE

[72] Inventors: Edward Curtis Ambler, Newington; Andrew E. Scoville, Ellington, both of Conn.

[73] Assignee: The Stanley Works, New Britain, Conn.

[22] Filed: Dec. 28, 1970

[21] Appl. No.: 101,534

[52] U.S. Cl................................317/18 D, 317/27 R, 317/35 SC
[51] Int. Cl..............................................................H02h 3/28
[58] Field of Search...............................317/18 D, 27, 33 SC

[56] References Cited

UNITED STATES PATENTS 3,558,980  1/1971  Florance........................317/33 SC
3,324,352  6/1967  Hover............................317/33 SC

*Primary Examiner*—James D. Trammell
*Attorney*—Peter L. Costas

[57] ABSTRACT

A protective device for connection to the conductors between an associated electrical power supply and an associated electrical load detects electrical leakage from the load. Solid state devices in the protective device are rendered conductive or nonconductive in response to an error signal produced by a differential transformer when there is imbalance between conductors. The amplified error signal is applied to the gate of a silicon controlled rectifier which shorts the power furnished to a unijunction transistor oscillator. The shorting action terminates a pulse trigger supply to the solid state devices to render them nonconductive.

7 Claims, 1 Drawing Figure

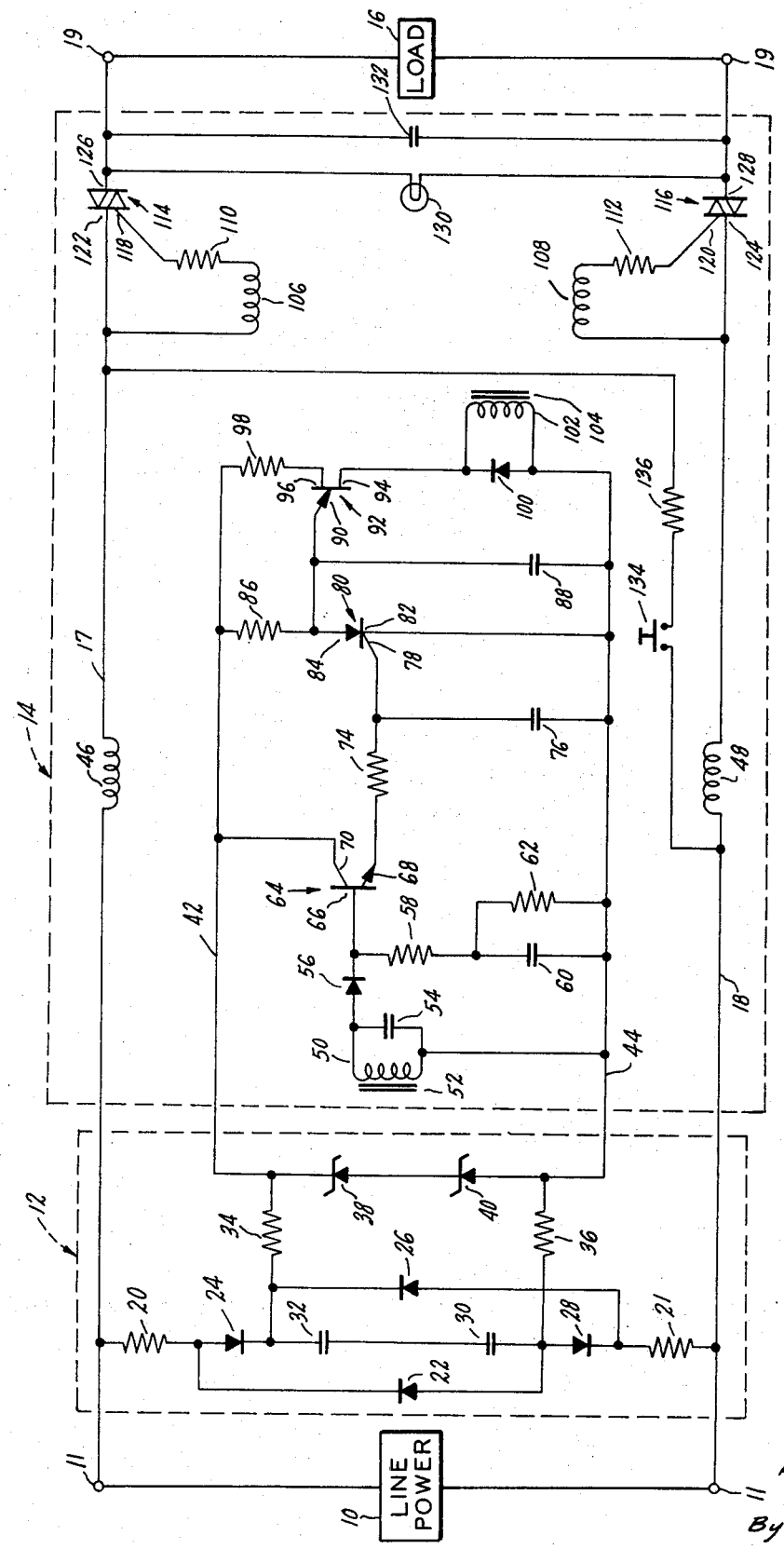

3,668,470

DEVICE FOR DETECTION AND CONTROL OF CURRENT LEAKAGE

BACKGROUND OF THE INVENTION

Increasing use of electrical power for many diverse applications along with increasing concern about hazards associated with such use has produced requirements for detection and control of current leakage from the electrically powered devices. Conventional circuit breakers generally provide an "overload" portion adapted to provide circuit interruption when there is a current moderately above a nominal rating of the circuit breaker flowing for some reasonably extended period of time and, in addition, a "short circuit" trip portion designed instantaneously to interrupt a circuit if it detects a current considerably above the nominal rating. The "overload" and "short circuit" protection portions provided in such circuit breakers do not protect against line-to-ground leakage paths when current flowing is less than the nominal rating of the breaker. Accordingly, to prevent electrocution of persons using electrical devices as well as to prevent fires or explosions, a number of arrangements for effecting such ground fault protection have been disclosed.

Considerable difficulty has been experienced with many of these devices and particularly with false or nuisance tripping problems which have deterred more widespread use. When such devices are used at a panelboard or a switchboard to limit ground fault current, the cumulative leakage of the various electrical devices connected to that branch circuit often results in a ground fault trip although no one of the devices has leakage sufficient to be hazardous. If the rating or set point of the ground fault detection device is raised to a sufficient level to allow current flow and avoid nuisance tripping, the leakage from a particular device may be hazardous to personnel or likely to cause fire or explosion although the higher branch circuit ground fault limit has not yet been reached.

The utilization of such devices in conjunction with individual devices as opposed to branch circuits carrying a plurality of devices has been prevented in large part because of high initial and operating costs for devices heretofore known. Additionally, some such devices were incapable of providing the necessary sensitivity at reasonable cost as is required for use with a single device which may be readily marketed. Such prior art devices which utilize relays or conventional over-center toggle linkage circuit breakers have also tended to be slow in response time and have therefore been unsatisfactory.

The reliability of mechanical devices as well as many electrical devices has also been a problem particularly since such failures may result in electrically "live" unprotected circuits. Size of ground fault protection devices has also been rather large so as to deter more widespread usage.

It is an object of the present invention to provide a novel ground fault protection device which is capable of sensing very small ground faults and which may be manufactured at relatively low cost and which is adapted to facile use in an electrical circuit adjacent the device from which leakage may occur.

It is also an object to provide such a ground fault protection device which may be simply and economically constructed and adjusted to open a circuit in response to dangerous ground fault conditions while avoiding nuisance tripping.

Another object is to provide such a device having a high operating speed to insure that the fault will be cleared quickly enough to prevent electrocution and also to minimize the likelihood of fire or explosion.

Still another object of the invention is to provide such a device which is failsafe in design to minimize the impact of component failure within the protection circuit.

A further object is to provide such a device which may be readily assembled from relatively available and readily constructed component parts and which is capable of long lived operation as well as facile and accurate variation in the magnitude of its operational level.

SUMMARY OF THE INVENTION

There has now been found that the foregoing and related objects can be readily attained in a protective circuit device for detection and control of current leakage from an associated electrical load utilizing a first pair of terminals for connection to an external associated alternating current line power supply, second pair of terminals for connection to an external associated load, and at least one solid state device, connecting one of the first pair of terminals and one of the second pair of terminals, having conductive and nonconductive states. Means for changing the prevailing state of the solid state device are provided which include means generating a pulse trigger signal which is transmittable to the solid state device to maintain one of such states. The state of the solid state device changes upon termination of the pulse trigger signal. A differential transformer has a core of magnetically susceptible metal, a pair of like primary windings and a secondary winding disposed about a common core, with each of the primary windings being connected in series between one of the first pair of terminals and one of the second pair of terminals. The pair of primary windings under balanced current conditions produces a balanced total magnetomotive force so that the net magnetic flux in the core is zero, and the pair of primary windings under leakage current conditions produces an unbalanced magnetomotive force to create a voltage in the secondary winding of said differential transformer. Means responsive to the voltage in the secondary winding terminate the pulse trigger signal whereby the state of the solid state device may be changed to open the circuit controlled.

The protective circuit device most desirably includes a selectively conductive silicon controlled rectifier connected to the means for generating a pulse trigger signal to prevent generation of the pulse trigger signal and the means responsive to said voltage in the secondary winding for terminating the pulse trigger signal includes a rectifier.

The protective circuit device most desirably includes means responsive to said voltage in the secondary winding for terminating the pulse trigger signal having a stageof solid state amplification for the voltage and a second solid state device connected between the other of the first pair of terminals and the other of the second pair of terminals, and has conductive and nonconductive states controlled by the means for changing the prevailing state of the first-mentioned solid state device. The solid state devices preferably are triacs and the means generating a pulse trigger signal includes a unijunction transistor oscillator and a bridge rectifier for rectifying the associated alternating current line power supply.

BRIEF DESCRIPTION OF THE DRAWINGS

The single FIGURE is a circuit diagram of a protective circuit device embodying the present invention.

DETAILED DESCRIPTION OF THE ILLUSTRATED EMBODIMENTS

Turning now in detail to the attached drawing, therein illustrated is a source of alternating current line power 10 and a load 16 connected in series relation to a protective circuit device embodying the present invention. The device has input terminals 11 for the protective circuit power supply 12, and a sensing and isolation circuit generally designated by the numeral 14. Conductors 17, 18 provide a current flow path for line power between input terminals 11 and the output terminals 19 across which the load 16 is connected.

The power supply 12 includes resistors 20, 21 connecting the line power to a bridge rectifier including diodes 22, 24, 26, 28. The resistor 36 is connected to the common junction of diodes 22 and 28, and the resistor 34 is connected to the common junction points of diodes 24 and 26 which are connected to zener diodes 38, 40 to provide voltage regulation of the bridge output. In the illustrated embodiment, the zener diodes 38, 40 are connected in series to provide voltage regulation which may be precisely established and which is not significantly affected by changes in input voltage or junction temperature. The rectified and regulated voltage output of the power supply 12 is carried by conductors 42, 44 to the sensing and isolation circuit 14.

Interposed in the line current conductors 17, 18 respectively are two identical transformer primary windings 46, 48 disposed about a common core 52 of magnetically susceptible metal together with a differential current sensing secondary winding 50. The core 52 is preferably of ferrite construction or tape wound, and primary windings 46, 48 are normally wound in the same direction with the same number of turns about the same portion of core 52.

Equal current in line conductors 17, 18 and therefore equal current in primary windings 46, 48 results in magnetic flux being created in each primary winding which is of the same magnitude and in opposite directions because of the opposite directional current flow in the conductors 17, 18. Accordingly, there is zero magnetic flux because the flux of the two primary windings 46, 48 cancels out, and no electromotive force is induced in the secondary winding 50.

In the event that there is leakage of current from the load 16, the current flow in the primary windings 46, 48 will not be equal and a net magnetic flux will be produced which will cause a voltage to appear across the secondary winding 50. That voltage is a signal which is then amplified and utilized to control the circuitry which isolates the electrical load.

The capacitor 54 is connected across the secondary winding 50 and is also connected on one side of the DC reference level of conductor 44 and on the other side to the diode 56 which rectifies the output of the secondary winding 50. Connected to the other side of diode 56 in series relation to each other are the resistor 58 and the capacitor 60; the capacitor 60 is an integrator and filter for the output of the differential transformer secondary winding 50 and the resistor 58 limits current flow through the diode 56 into the capacitor 60 during circuit start up. A resistor 62 is positioned in parallel between resistor 58 and the conductor 44 for the purpose of providing sensitivity adjustment for the circuit.

Additionally connected to one side of the diode 56 is the base 66 of the transistor 64 which is of the n-p-n type. The collector 70 of transistor 64 is connected to the conductor 42 and the emitter 68 thereof transmits the amplified current leakage signal to the resistor 74 which controls the current supplied to the gate 78 of a silicon controlled rectifier (SCR) 80. The signal is filtered to remove spurious noise spikes by the capacitor 76 which is connected between the gate 78 and the conductor 44. The rectifier (SCR) 80 has a cathode 82 connected to the conductor 44 and an anode 84 connected to the conductor 42 in series with the resistor 86. Connected to the anode 84 of SCR 80 are a filter or capacitor 88 and the emitter 90 of unijunction transistor 92 having a first base 94 and a second base 96. The first base 94 is connected to a pulse transformer primary winding 102 having connected across it a diode 100 for wave shaping. The second base 96 is connected to the conductor 42 through the resistor 98 which controls biasing of the unijunction transistor 92. The primary winding 102 is coupled through the single core 104 to the secondary windings 106 and 108 which are in turn connected through the resistors 110, 112 to the gates 118, 120 of the triacs 114, 116.

Terminals 122, 126 of triac 114 are interposed in the conductor 17; by means of the signal applied to the gate 118, the triac is rendered conducting or nonconducting. Similarly, the terminals 124, 128 of triac 116 are interposed in conductor 18, and the triac is rendered conducting or nonconducting by the signal applied to the gate 120. An indicating light 130 is connected across conductors 17, 18 to sense if both triacs 114, 116 are conductive. A capacitor 132 is positioned in parallel to the indicator light 130 as is the operating load 16 which is connected between terminals 19, 19.

Test provision is provided by means of a momentary push-button switch 134 connected in series with a resistor 136 between the conductors 17, 18 to establish a momentary current flow path whereby current flows through differential transformer primary winding 46 and does not flow through the other differential transformer primary winding 48. The resistor 136 limits the maximum current draw during test operation.

OPERATION OF THE DEVICE

Connection of the source of line power 10 to the input terminals 11, 11 energizes the conductors 17, 18 and the power supply 12.

During one half of each line power cycle, the current will flow through the resistor 20, diode 22, resistor 36, zener diodes 40 and 38, resistor 34, diode 26, and thence through resistor 21 back to the line power source 10. During the other half of each line power source cycle, current will flow through resistor 21, diode 28, resistor 36, zener diodes 40 and 38, resistor 34, diode 24, and then by resistor 20 back to the source of line power 10. The capacitors 30, 32 are connected in series between the common junction points of diodes 22 and 28, and between the common junction point of diodes 24 and 26 to provide a filtering of the bridge output.

A difference in current flow between the windings 46, 48 produces a flux in the secondary winding 50 of the differential transformer and the alternating current potential is rectified by the diode 56. The capacitor 54 is preferably placed across the secondary winding 50 to achieve a tuning effect whereby increased sensitivity is achieved. Accordingly, a less expensive transformer may be utilized. Alternatively, if a transformer having too great a "turns-product" is used, a capacitor 54 having greater capacitance may be utilized to decrease sensitivity and achieve a better signal to noise ratio. The output of the secondary winding 50 is rectified by the diode 56, and the signal is filtered and integrated by the capacitor 60 before being applied to the base 66 of the transistor 64.

Adjustment of the resistance of the resistor 62 will vary current flow away from the base 66 of the transistor 64 and to the DC reference level of the conductor 44 to thereby adjust signal strength. The amplified signal from the transistor 64 to the resistor 74 which limits the gate current to the SCR 80, and the capacitor 76 limits spurious noise spikes. It will be understood that the signal applied to the gate 78 of SCR 80 occurs only when a voltage is developed across the differential transformer secondary winding 50. At all other times, no signal will be applied to the gate 78 and SCR 80 will not conduct. Accordingly, the potential between the conductors 42 and 44 will cause the capacitor 88 to charge through the resistor 86 to the firing point level of the unijunction transistor 92.

The resistor 86 allows sufficient current flow to the oscillator when silicon controlled rectifier 80 is nonconductive and limits the current drain on the power supply when the silicon controlled rectifier 80 is conductive. When the unijunction transistor 92 fires, the the capacitor 88 is discharged through the emitter 90 to the base 94 and the pulse transformer primary winding 102. The cyclic repetition of this series of events creates a pulse train which appears not only at the primary winding 102 but also at the secondary windings 106, 108 and thereby at the gates 118, 120 of traics 114, 116 causing them to remain in a conductive state. The use of an oscillator in the manner as opposed to a fixed bias results in minimum power consumption to control the triacs 114, 116.

When a differential voltage is produced in the winding 50, a signal is applied to the gate 78 of SCR 80 causing it to be conductive between anode 84 and cathode 82 which prevents charging of capacitor 88. Accordingly, the unijunction transistor 92 will not reach its firing level and no pulse train is produced in the pulse transformer windings 102, 106, 108. As a result, the triacs 114, 116 will not be conductive and output terminals 19 will be isolated from input terminals 11.

The indicator light 130 is provided to show when both triacs 114, 116 are in the conductive state. To test the operation of the circuitry, momentary switch 134 is depressed which allows the current to flow through differential transformer winding 46 but not through differential transformer winding 48, thereby simulating a ground fault condition. With normal operation of this test feature, depression of the momentary switch 134 will cause the triacs 114, 116 to go into a nonconductive state.

With either the simulated ground fault described or a true ground fault, the SCR 80, upon becoming conductive in response to a gate signal, will continue to conduct as long as current flow continued between its anode 84 and cathode 82. In normal operation, the only way current flow may be interrupted between these points is by means of disconnection from the source of line power. More specifically, this will ordinarily mean disconnecting the conductors 17, 18 from the line power 10 as, for example, by removing a plug for the load providing device from a conventional house receptacle. When disconnected from the line power 10, the SCR 80 of the illustrated embodiment of circuit protective device will return to its nonconductive state.

Although the present invention has been illustrated and described with respect to a single phase circuit protective device, it will be readily appreciated that it is also adapted for use with respect to polyphase circuits. Moreover it is apparent that significantly different arrangements of the components and different components may be used without departing from the spirit of the invention.

The differential transformer may have a laminated core; different thyristor devices may be used in place of those shown; and one capacitor may be used in place of the two shown in the bridge rectifier. By the components illustrated, the protective circuit device may be calibrated and set to respond to predetermined levels of ground fault leakage, thus avoiding spurious operation while at the same time ensuring essentially instantaneous action.

As will be appreciated a reset switch that will momentarily open the current path through the line power conductors may be used to facilitate resetting where the device is permanently installed such as at an electrical receptacle. The terminals for connection to external line power and load may merely be male and female connectors.

Thus, it can be seen from the foregoing detailed specification and drawing that the present invention provides a highly effective ground fault protective device which is capable of sensitive response to ground faults and which is relatively inexpensive to manufacture and operate. By being particularly adapted for use near the point where the electrical power is used (at the load), it avoids nuisance tripping while at the same time quickly and accurately responding to small leakage currents. It will also be seen that the failure of most components will cause the circuit to interrupt power and therefore the design is of fail safe nature. The relative simplicity of the circuit protective device and the components chosen makes assembly simple and promotes reliability of the finished product.

We claim:

1. A protective circuit device for detection and control of current leakage from an associated electrical load comprising:
    a. a first pair of terminals for connection to an external associated alternating current line power supply;
    b. a second pair of terminals for connection to an external associated load;
    c. at least one solid state device connecting one of said first pair of terminals and one of said second pair of terminals, said solid state device having conductive and nonconductive states;
    d. means for changing the prevailing state of said solid state device including means generating a pulse trigger signal, said pulse trigger signal being transmittable to said solid state device to maintain one of such states, the state of said solid state device changing upon termination of said pulse trigger signal;
    e. a differential transformer having a core of magnetically susceptible metal, a pair of like primary windings disposed about said core, and a secondary winding disposed about said core, each of said primary windings being connected in a series between one of said first pair of terminals and one of said second pair of terminals, said pair of primary windings under balanced current conditions therein producing a balanced total magnetomotive force so that the net magnetic flux in said core is zero, said pair of primary windings under leakage current conditions producing an unbalanced magnetomotive force to create a voltage in said secondary winding of said differential transformer;
    f. and means responsive to said voltage in said secondary winding for terminating said pulse trigger signal whereby the state of said solid state device may be changed to open the circuit controlled thereby, said means responsive to said voltage in said secondary winding including a selectively conductive silicon controlled rectifier connected to said means for generating a pulse trigger signal to prevent generation of said pulse trigger signal, said silicon controller rectifier being normally nonconductive and becoming conductive and latching in the conductive state upon detection of a predetermined voltage in said secondary winding to open said circuit and to maintain said circuit in the open condition.

2. The protective circuit device of claim 1 wherein said means responsive to said voltage in said secondary winding for terminating said pulse trigger signal includes a rectifier.

3. The protective circuit device of claim 2 wherein said means responsive to said voltage in said secondary winding for terminating said pulse trigger signal also includes a stage of solid state amplification for said voltage.

4. The protective circuit device of claim 1 wherein a second solid state device is connected between the other of said first pair of terminals and the other of said second pair of terminals, said second solid state device having conductive and nonconductive states controlled by said means for changing the prevailing state of said first-mentioned solid state device.

5. The protective circuit device of claim 4 wherein said solid state devices are triacs.

6. The protective circuit device of claim 5 wherein said means generating a pulse trigger signal comprises a unijunction transistor oscillator.

7. The protective circuit device of claim 6 wherein said means generating a pulse trigger signal includes a bridge rectifier for rectifying the associated alternating current line power supply.

* * * * *